United States Patent [19]
Dreyfus

[11] 3,946,157
[45] Mar. 23, 1976

[54] SPEECH RECOGNITION DEVICE FOR CONTROLLING A MACHINE

[76] Inventor: Jean Albert Dreyfus, 5 Avenue de la Grenade, Geneva, Switzerland

[22] Filed: Aug. 9, 1974

[21] Appl. No.: 496,326

Related U.S. Application Data

[63] Continuation-in-part of Ser. No. 280,723, Aug. 14, 1972, abandoned.

[30] Foreign Application Priority Data

Aug. 18, 1971  Switzerland...................... 12177/71
Aug. 1, 1972  Switzerland...................... 11462/72

[52] U.S. Cl............................................. 179/1 SA
[51] Int. Cl.$^2$........................................... G10L 1/00
[58] Field of Search ....................... 179/1 SA, 1 SM

[56] References Cited
UNITED STATES PATENTS

| | | |
|---|---|---|
| 3,238,301 | 3/1966 | Dreyfus.................................. 179/1 |
| 3,553,372 | 1/1971 | Wright.................................... 179/1 |
| 3,619,509 | 11/1971 | Barger ............................. 179/1 SA |
| 3,679,830 | 7/1972 | Uffelman et al.................. 179/1 SA |
| 3,838,217 | 9/1974 | Dreyfus............................... 179/1 A |

Primary Examiner—Kathleen H. Claffy
Assistant Examiner—E. S. Kemeny
Attorney, Agent, or Firm—Werner W. Kleeman

[57] ABSTRACT

In an apparatus for speech recognition, intended for controlling machines, spoken words are synthesized from two to twelve phoneme classes. Phonemes are recognized by analysis of speech sounds, measuring and comparing energy and time-rate of change of energy in certain frequency bands. Words are recognized by further logic means analyzing phoneme classes.

One particular feature determines the plosive class "T" versus the fricative class "S" by measuring energy rise-time.

16 Claims, 9 Drawing Figures

| Optical shapes | 0 | 1 | 2 | 3 | 4 | 5 | 6 | 7 | 8 | 9 |
|---|---|---|---|---|---|---|---|---|---|---|
| 102 French | zéro | un | deux | trois | quatre | cinq | six | sept | huit | neuf |
| 103 Root | (OIN) | OIN | DUWO | TRE | K^w TWR | PENK | SEKS | SEPT | OKT | NEWN |
| 104 Sanskrit | - | oin | dvi | trayah | catvarah | panka | sat | sapta | asta | octo |
| 105 Greek | - | ēn | duo | tria | tettares | pente | hex | hepta | oktō | hennea |
| 106 Latin | (nullus) | unus | duo | tres | quattuor | quinque | sex | septem | octo | noven |
| 107 English | zero | one | two | three | four | five | six | seven | eight | nine |
| 108 German | null | eins | zwei | drei | vier | fünf | sechs | sieben | acht | neun |
| 109 Italian | zero | uno | due | tre | quattro | cinque | sei | sette | otto | nove |
| 110 Portugues | zeru | um | dois | três | quatro | cinco | seis | sete | oito | nove |
| 111 Polish | zero | jeden | dwaj | drzel | szery | pięc | szeesc | siedem | osiem | dziewiec |
| 112 Esperanto | nulo | unu | du | tri | kvar | kvin | ses | sep | ok | .nau |
| 113 Hungarian | nulla | egy | kettö | három | négy | öt | hat | hét | nyolc | kilenc |
| 114 Finnish | nolla | yiksi | kaksi | kolme | nellä | viisi | kuusi | seitsemän | kahdeksän | yhdeksän |
| 115 Turkish | sifir | bir | iki | üç | dört | bes | alti | yedi | sekiz | dokuz |
| 116 Arabian | sfer | wāh'd | zūj | tlāte | reb'a | khemsa | setta | seb'a | tmenya | tes'ūd |
| 117 Hebrew | nul | eHad | chenayme | chelocha | arba'a | Hamicha | chicha | chiv'a | chemona | ticha |
| 118 Chinese | ling | yi | ēr | san | sì | wū | liu | qi | ba | jiu |
| 119 Japanese | zero | ichi | ni | san | chi | go | roku | shichi | hachi | ku |
| 120 Maya (0-19) | imix | ik | akbal | kan | chicchan | cimi | manik | lamat | muluc | oc |
| 121 SOTINA | 0 | I | TO | TI | TA | SO | SI | SA | NI | NĀ |
| 122 SETE | S | T | TS | TT | SS | ST | TTS | TTT | SSS | SST |
| Acoustic shapes | | | | | | | | | | |

SPEECH RECOGNITION DEVICE FOR CONTROLLING A MACHINE

CROSS-REFERENCE TO RELATED CASE

This application is a continuation-in-part application of my copending U.S. application Ser. No. 280,723, filed Aug. 14, 1972 and entitled "Speech-Recognition Device For Controlling A Machine", now abandoned.

BACKGROUND OF THE INVENTION

The present invention relates to a new and improved construction of speech recognition device intended to control machines by means of words composed of phonetic elements.

It is known that certain prior art speech recognition devices operate with natural speech or with speech codes. These codes can consist of, for instance, combinations of vowels. However, the heretofore known speeches or codes have the following drawbacks:

1. They cannot be equally pronounced by individuals of different mother tongue. An Englishman, a Frenchman, a German, a Russian, an Arab and a Japanese cannot pronounce the known languages or codes with the same ease and precision;

2. The prior art speech recognition devices are complicated in construction and cannot detect such speech or codes without previous individual learning;

3. The known languages or codes are not capable of detecting whispered speech. The recognition of whispered speech is particularly then important for individuals which because of possible illness are inflicted with a temporary or continual loss of speech. Furthermore, whispered speech is necessary in order to maintain secrets during voice transmission. In principle there are no strict limits between whispered and normal (unvoiced and voiced) speech, so that with the heretofore known devices additional errors occur;

4. The known codes are not capable of being enlarged, something which is then particularly discernible when it is intended to use vowels;

5. The words and sentences of the known codes cannot be spoken with maximum speed and minimum effort, since the phonetic and linguistic rules are not designed for this purpose.

SUMMARY OF THE INVENTION

Hence, it is a primary object of the present invention to provide an improved speech recognition device for controlling a machine which is not associated with the aforementioned drawbacks and limitations.

Another and more specific object of the present invention aims at an improved construction of speech recognition device for controlling a machine which is capable of reliably and accurately recognizing spoken words.

Now in order to implement these and still further objects of the invention, which will become more readily apparent as the description proceeds, the invention contemplates the provision of a speech recognition apparatus or device for controlling the machine, the apparatus receiving words; these words being classified in a reduced plurality of three through twelve phoneme classes, said apparatus including:

a. an input means for receiving said words,
b. first means responsive to said words indicating short-time energy values of said words, said first means producing a first output signal representing rising temporal energy flanks, nearly constant energy levels and zero levels of said words;
c. second means responsive to said words and producing a second output signal representing a steepness of said rising temporal energy flanks exceeding a determined limit value;
d. a first logic means
 i. responsive to said first output signal segmenting said words into phonetic elements, indicated by both the rising temporal energy flanks and the ends of the nearly constant energy levels and indicating an end of each word only by a zero level which exceeds a determined value of time duration producing a third output signal;
 ii. responsive to said second output signal separating a class of the plosive phonetic elements from the class of the fricative phonetic elements and producing a fourth output signal;
e. second logic means for detecting a sequence of the occurrence of said phonetic elements within one word; and
f. output means for controlling a machine as a result of detected words.

According to further details of the invention there is provided a speech-recognition system for controlling a machine, said system receiving words, said words being classified in a reduced plurality of three through twelve phoneme classes, said system including:

a. an input means for receiving said words;
b. first means responsive to said words indicating short-time energy values of said words, said first means producing a first output signal representing rising temporal energy flanks, nearly constant energy levels and zero levels of said words;
c. second means responsive to said words and producing a second output signal representing a steepness of said rising temporal energy flanks exceeding a determined limit value;
d. third means responsive to said words producing at least three output signals representing said short-time energy values distributed in at least three ranges of frequency;
e. first logic means
 i. responsive to said first output signal segmenting said words into phonetic elements, indicated by both the rising temporal energy flanks and the ends of the nearly constant energy levels, and indicating an end of each word only by a zero level which exceeds a determined value of time duration producing a third output signal,
 ii. responsive to said second output signal separating a class of the plosive phonetic elements from the class of the fricative phonetic elements and producing a fourth output signal,
 iii. responsive to said three output signals for detecting the plosive class, the fricative class and at least one vowel class and producing a fifth, sixth and seventh output signal,
f. second logic means for detecting a sequence of the occurrence of said phonetic elements within one word; and
g. output means for controlling a machine as a result of the detected words.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
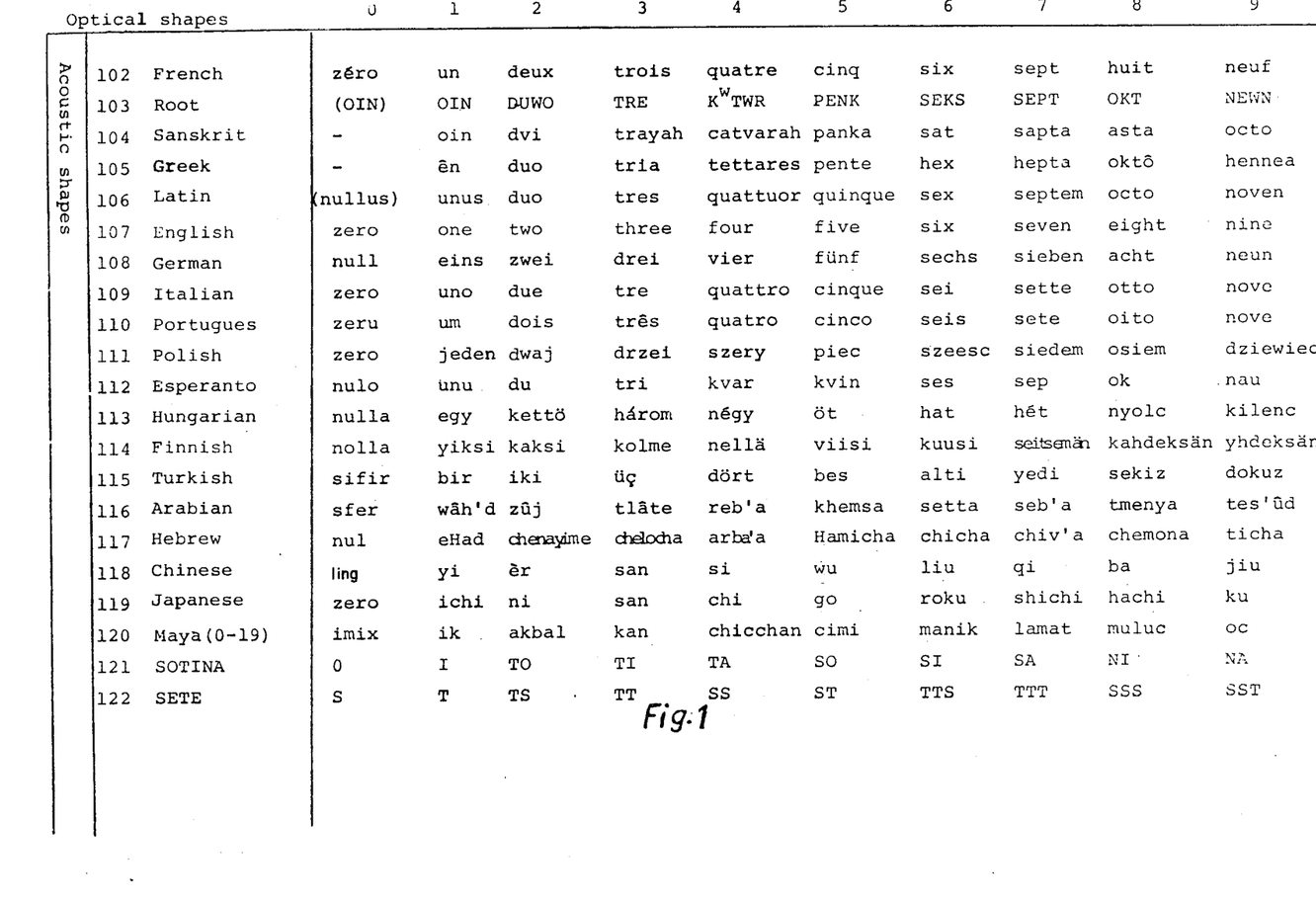
FIG. 1 illustrates optical and acoustic shapes of the numerals from 0 to 9.

Describing now the drawings, in FIG. 1, line 101, there are illustrated the optical shapes or configurations of the numerals 0 to 9. These numerals are generally known and are equally understood by practically all individuals. In contrast to the international standardized optical form or shape of the numerals there acoustic "form or shape" has been shown in lines 102 to 120 of FIG. 1 in different languages. These examples, which only show the smallest amount of the acoustical multiplicity of forms, possess more than 60 different phonemes. A code, which has been spoken in the same manner by individuals of different mother tongue, has been illustrated in line 121 of FIG. 1. This code designated as "SOTINA" is used by way of example with the apparatus construction of this development. The individual constructional circuit features of the inventive apparatus, and which are thereby considerably simplified, have been illustrated in FIG. 2. In FIG. 1, line 122, there is shown a still simpler code, known as "SETE" and is only whispered. In contrast to the other code described in line 121, it possesses only both of the classes S and T of the phonemes. The "SOTINA" phonocode is based on both the simplicity of the visual or optical shapes (line 101) and the roots of Sanskrit (lines 103 and 104).

Figure 2:
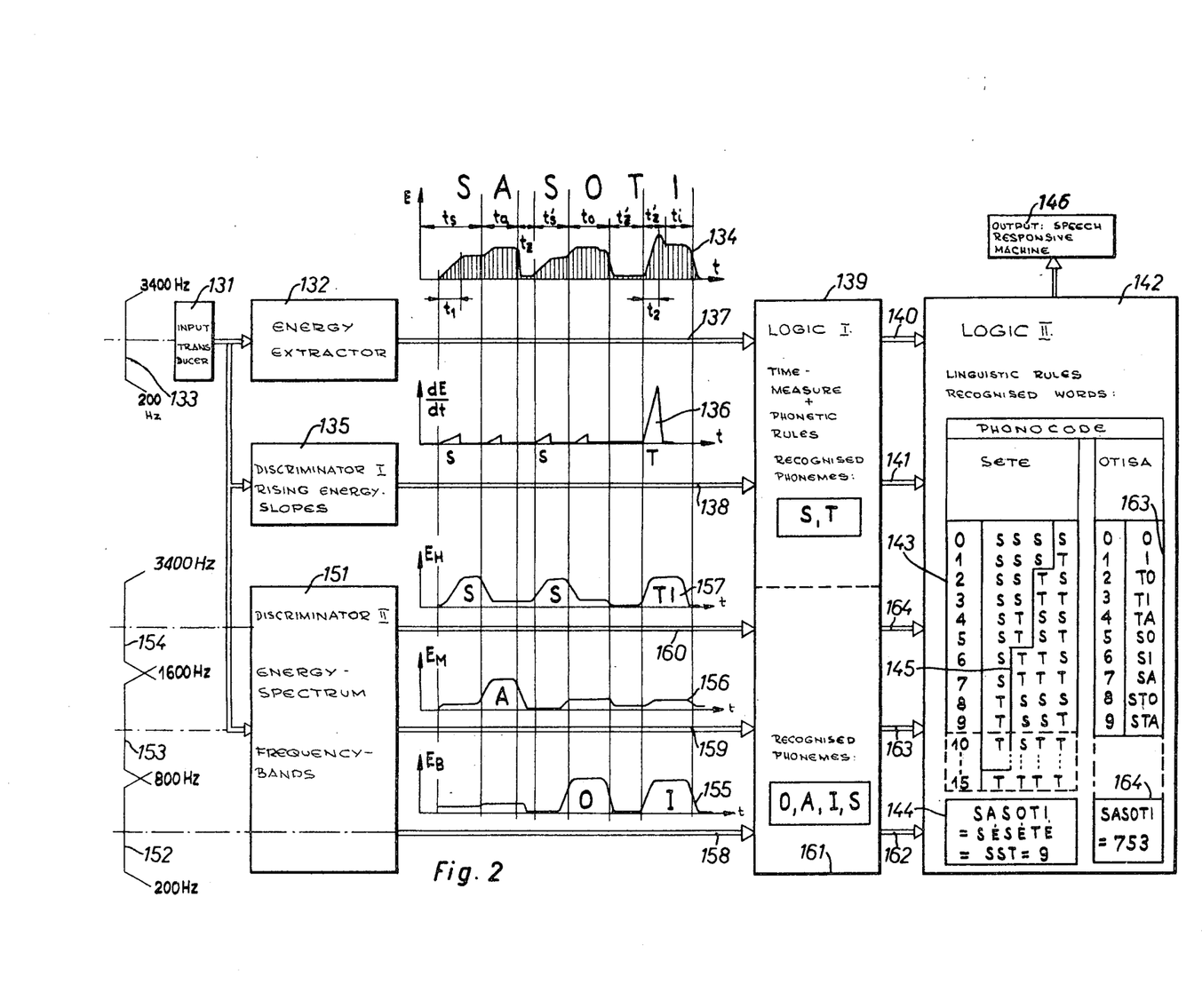
FIG. 2 is a basic block diagram of the speech recognition device of this development.

Before considering in greater detail an exemplary embodiment of the inventive apparatus as shown in FIG. 2, there will be initially defined the definitions of the classes of the speech elements or phonemes. In the following Table I there have been listed the classes of the speech elements of phonemes which have been internationally defined. These are classes which generally are easiest to speak.

TABLE I

| Consonants | Symbol | Phonetic Values | Vowels | Symbol | Phonetic Values |
|---|---|---|---|---|---|
| 1. Plosives | T | p,t,k | 1. low | O | o, u |
| 2. Fricatives | S | s, sch, f | 2. medium | A | a |
| 3. Nasal | N | n, m | 3. high | I | i, e |
|  |  |  | 4. whispered | Ë | Ö, Ä, Ï |

The classes defined in Table I are designated by upper case letters. The phonetic values of the individual phonemes or speech elements are designated by lower case letters. The vowels also may be whispered. These are generally designated by the letter Ë. Under whispering there is to be understood that the vowels are spoken in a voiceless manner. The individual vowel classes O, A, I are designated by Ö, Ä, Ï when they are whispered. All vowel classes, irrespective whether they are spoken in a voiced or voiceless manner, are designated by Ë.

Based upon the showing of FIG. 2 there will initially be discussed a simplified example of the inventive apparatus. The input 131 may be a microphone, a magnetic tape or a vocoder. In the embodiment under discussion it is assumed that the input 131 is constituted by a microphone. The operator now speaks or whispers the word "SASOTI" or "SESETE" into the microphone. The electrical signals which are thus generated arrive at the subsequently arranged circuit stages. The extractor 132 delivers the entire speech energy of the signals, with a standardized frequency spectrum, for example in the telephone band frequency of between 200 Hz and 3400 Hz, as shown for instance by the damping curve 133. If, for instance, the word "SASOTI" has been pronounced, then there prevails the energy curve as a function of time i.e. temporal energy curve or characteristic 134 at which there is plotted the course or evolution of the entire energy E as function of time $t$. The ascending and descending time-constants are in the order of magnitude of 1 to 10 milliseconds (ms). The curve 134 determines the different time sections of the phoneme signals $t_s$, $t_a$, $t_{s'}$, $t_o$, $t_t$, $t_i$ as well as the pauses $t_z$, $t_{z'}$ between such signals. The discriminator 135 determines the steepness of the ascending flanks or slopes within a temporal energy curve or characteristic in a telephone frequency band which characterizes the class T of the plosive consonants and the class S of the fricative consonants. Consequently both of these classes are separated from one another. At the output of the discriminator 135 there appears the differential curve 136 as a function of time i.e. the time derivative $dE/dt$ of the energy as a function of the time $t$ and such is delivered via the conductor or line 138 to the first logic control circuit or logic component 139. In this control circuit there are carried out the time measurements in that there are detected both the time sections of the individual classes as well the time sections between the classes. On the basis of such time measurements and the phonetic rules the logic means provides a clear separation of both elementry words TË and SË. By means of the conductors 140, 141 these electrical signals of both classes are delivered to a second logic control circuit or logic component 142 where they are used linguistic rules and there are detected certain combinations of the elementry words TË and SË. These combinations are designated as non-elementary words. At this point it is to be mentioned that logic circuits suitable for the purpose of the invention are well known to the art, as exemplified for instance in applicant's U.S. Pat. No. 3,838,217, granted Sept. 24, 1974, and hereinafter mentioned publications. According to the invention the following requirements should be fulfilled so that the individual non-elementary words must be separated from each other by "external" pauses or intervals. These "external" pauses have a value which is greater than, for instance, 0.2 or 0.5 second. In contrast thereto the "internal" pauses or intervals between the elementary words, such as for instance $t_z$, $t_{z'}$, are smaller than 0.2 or 0.5 second and are appropriately taken into account in the first logic control circuit or logic component 139 as already explained. The operator is capable of selecting between three different pronunciations of the word "SASOTI":
 a. voiced "SASOTI",
 b. voiceless with vowel timber or sound color "SÁSÒTÍ",
 c. voiceless without vowel timber "SESETE".

These three pronunciation possibilities are designated by "SESETE" or in an abbreviated written form by "SST". Consequently, it should be recognized that the separate recognition of vowel classes, such as O, A, I is superfluous. As already mentioned in conjunction with the description of FIG. 1 a word such as "SST" can represent part of a phonocode. This phonocode is fixedly arranged in the second logic control circuit 142. As an example herefor there is illustrated in FIG. 2 a phonocode which can be used both in binary as well as decimal form, as shown by the Table 143. The phonocode is extensively simplified since the pauses or intervals between the elementary words and the nonelementary words can be separately detected. This simplification is provided in that there is only used the phonocode located at the right of the line 145. The second logic control circuit detects or recognizes the code SST as the numeral 9. This is indicated by the indicator 144. The device 146 is controlled as a function of the recognized numeral. As already mentioned the device 146 can be a machine for recording or writing or for controlling further installations.

If the equipment of this invention is to be further refined then there can be connected parallel to the extractor 132 and the discriminator 135 a further discriminator 151. This discriminator determines the spectrum distribution of the speech energy in at least two of three frequency bands. These frequency bands have been illustrated to the left of the discriminator 151 in the form of the curves 152, 153, 154 with the associated frequencies 200 Hz to 800 Hz, 800 Hz to 1600 Hz, 1600 Hz to 3400 Hz. These individual curves correspond to the low, medium and high vowel classes O, A, I.

Now if the operator pronounces for instance the word "SASOTI", i.e. without whispering, then there is formed by means of the extractor 132 the previously described curve 134. Furthermore, the first discriminator 135 delivers via the conductor or line 138 the curve 136. i.e. a signal corresponding to such curve. At the discriminator 151 there is determined according to the three frequency bands 152, 153, 154 the spectrum distribution and delivered as the curves 155, 156, 157 at the conductors 158, 159, 160 to the supplementary component 161 of the first logic control circuit 139. In the first logic control circuit the phonetic rules are employed and the classes S and T as well as the classes O, A, I, S are recognized. This occurs in that in such control circuit there is detected the time sections of the individual speech elements or phonemes in each class and the time intervals between the individual phonemes or speech elements. This is so both for the signals delivered via the conductors 137, 138 as well as also for the curves 155, 156, 157 appearing at the conductors or lines 158, 159, 160. The signals which are associated with the classes S and T arrive from the first logic control circuit 139 at the second logic control circuit 142. The signals which are associated with the classes O, A, I, S arrive through the agency of the conductors 162, 163, 164 likewise at the second logic control circuit 142. In this control circuit there are employed the linguistic rules which determine the elementary words and the non-elementary words.

The end of one of each vowel such as O, A, I determines the end of each elementary word such as SA, SO, TI. In this way there become insignificant "internal" pauses (shorter than 0.2 or 0.5 second) for the elementary segmentation. The end of one of each non-elementary word such as "SASOTI" is determined by an "external" pause which is greater than 0.2 or 0.5 second. A word such as "SASOTI" is part of the phonocode which is stored in the control circuit 142, according to the Table 163, wherein SA = 7, SO = 5, TI = 3 and the word "SASOTI" = 753. This thus recognized numeral 753 can control a device 146 in desired manner. To improve the understanding this number has been illustrated in the output 164. Such output unit can form part of the second logic control circuit 142 or can be arranged at a certain distance from such control circuit.

It should be mentioned that different phonocodes can be stored at the second logic control circuit 142. A great advantage of a phonocode consisting of at least five phoneme classes resides in the fact that it can be randomly expanded upon and it is possible to develop entire languages thereby which can be internationally and easily spoken. As already mentioned the inventive apparatus can easily detect such code.

Figures 3A, 3B, 4:
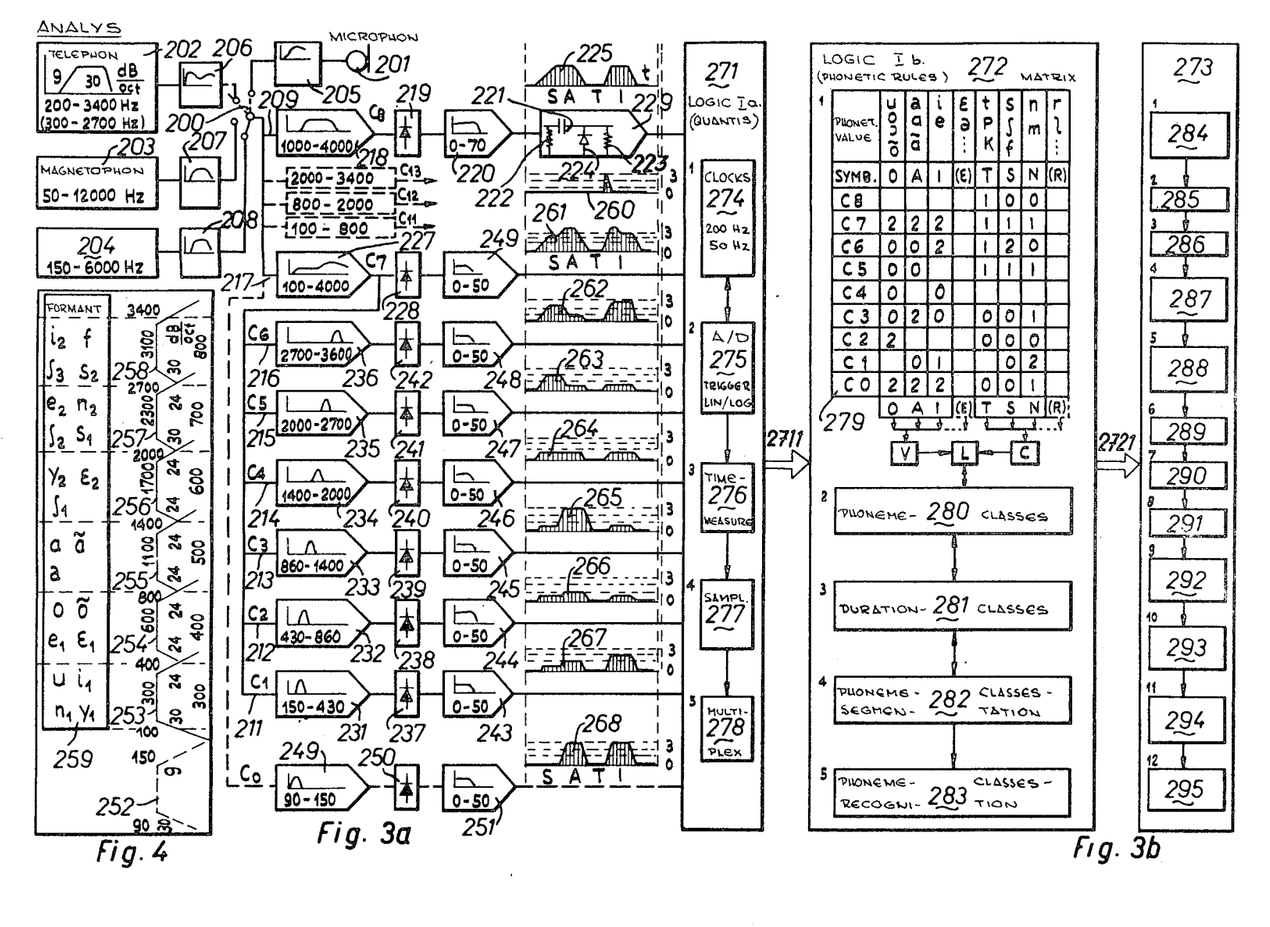
FIGS. 3a and 3b is a detailed illustration of the apparatus shown in FIG. 2.
FIG. 4 illustrates the damping curves for the filters portrayed in the arrangement of FIGS. 3a and 3b.

In FIGS. 3a and 3b there is depicted in detail the principal illustration of the inventive apparatus of FIG. 2. The electrical speech signals are delivered via the input switch 200 shown in FIG. 3a either by means of a microphone 201 or a telephone line 202 or a magnetic tape recorder 203 or a vocoder 204 which function as the input means 131. By means of the switch 200 it is possible to selectively connect in circuit the aforementioned different input devices. These devices are equipped at the connection conductor with the filters 205, 206, 207 and 208. The function of such filters is to standardize the frequency components of the different signal sources or devices in the same manner as with the human ear, i.e. to ensure that the frequency components between 200 Hz and 3400 Hz arrive in a normal form at the switch 200. These speech signals arrive through the agency of the input 209 of a plosive-discriminator channel C8 as well as via the inputs 211 to 217 at the spectrum-discriminator channels C1 to C7. As already described in conjunction with FIG. 2 the channel C8 responds to the speed of the energy change of the speech signals in a frequency band above 1000 Hz. The plosive-phoneme class T, to which belong the phonemes or speech elements $p$, $t$, $k$, builds-up in 5 milliseconds, and specifically after a pause of at least 50 milliseconds. The fricative-phoneme class S, to which belong the phoneme or speech elements $s, f, sch$, require at least 20 milliseconds to build-up and is characterized from the plosive sounds by the different buildup time. The discrimination between the plosive- and fricative-phoneme classes T, S can be carried out in different ways, such as for instance in analog or digital manner. In the detailed exemplary embodiment of FIG. 3a there has been illustrated analog discrimination. This analog device contains a band-pass filter 218 in the channel C8 which passes the frequency band of 1000 Hz to 4000 Hz, the rectifier arrangement 219, the low-pass filter 220, which passes the frequencies below 70 Hz, and the energy time differentiator 229. This differentiator 229 contains a capacitor 221, the resistors 222, 223 and the rectifier arrangement 224. The rectifier arrangement or rectifier sorts the ascending flanks of the curve 225 which should correspond to the word "SATI". It is assumed that this word has been infed from one of the four input devices 201 to 204 via the switch 200 to the entire apparatus.

The channels C1 to C7 sort the characteristic quasi-stationary energy bands of the non-plosive phoneme classes T̄. The symbol T̄ is defined for the non-plosive phoneme classes, such as for instance S, N. The channels C1 to C7, the inputs 211 to 217 of which are located parallel to the input 209 of the channel C8, are associated with the spectrum extractor. The channel C7 consists of the phonetic equalization filter 227 for the frequencies 100 Hz to 4000 Hz, the rectifier or rectifier arrangement 228 and the low-pass filter 229 with the throughpass frequency below 50 Hz. In this channel C7 there is developed the curve 261 of the word "SATI". This channel C7 indicates the entire dynamics or stated in another way the presence of the spoken word and corresponds to the extractor 132 of FIG. 1. At this point it is to be mentioned that the channel C8 and the curve 260 of FIG. 3a corresponds to the discriminator 135 and the curves 134 and 136 respectively of FIG. 1. The channels C1 to C6 of FIG. 3a, which correspond to the discriminator 151 with the output conductors or lines 158, 159, 160 of FIG. 1, determine the different non-plosive phoneme classes T̄. These channels C1 to C6 of FIG. 3 contain band-pass filters for different frequency bands. These frequency bands i.e. the throughpass ranges for the frequencies in Hz have been illustrated in the band-pass filters 231 to 236. These band-passes correspond to the characteristic frequency ranges or formants of the vowel classes O, A, I and the consonant class S, with which there are associated the phoneme class of the fricative speech elements. In contrast to FIG. 1 in FIG. 3a there is provided a further channel for the nasal phoneme class N. It is intended to be indicated that with the detailed showing of equipment of FIG. 3a it is possible to readily incorporate further supplementary or additional channels for additional phoneme classes. In this way the inventive apparatus can be constructed for the speech recognition of, for instance, up to 12 phoneme classes. The channels C1 to C6 are provided for the frequency range or formants of the five phoneme classes O, A, I, S N. Furthermore, in the aforementioned channels C1 to C6 there are also arranged the rectifiers 237, 238, 339, 240, 241, 242 and the low-pass filters 243, 244, 245, 246, 247, 248, whcih only pass the frequencies below 50 Hz. The channel C0 sorts the fundamental frequency of the speech which is between 80 Hz and 400 Hz. This channel C0 contains the band-pass filter 249 with a throughpass range of 90 Hz to 150 Hz, and the frequencies above 150 Hz are damped with only about 9 dB/octave. Furthermore, the channel C0 contains the rectifier 250 and the low pass filter 251 with a throughpass frequency below 50 Hz. This "pitch"-channel indicates the degree and possibly the amplitude or level of the voicing. Thus it permits altering the speech code as a function of the voicing, whereby there is also possible the separate recognition of the vowel classes such as for instance O, A, I if such are whispered.

The band-pass filters 231, 232, 233, 234, 235, 236, 249 of the channels C1, C2, C3, C4, C5, C6, C0 possess determined damping which has been plotted in FIG. 4 in the form of the curves 252, 253, 254, 255, 256, 257, 258. The curves 252 to 258 symbolically portray the damping per octave dB/octave, such as for instance, 24 or 30 dB/octave. The numerical values 90 Hz, 150 Hz, 100 Hz and so forth up to 3400 Hz indicate the manner in which the damping curves 252 to 258 are distributed. The vertical extending numbers 300 Hz, 400 Hz, 500 Hz, 600 Hz, 700 Hz, 800 Hz indicate the width of the damping curves. The other vertically extending numbers such as 300 Hz, 600 Hz, 1100 Hz, 1200 Hz, 2300 Hz, 3100 Hz indicate the average or mean frequency of each damping curve. The sequence of the damping curves shown in FIG. 4 is as follows: The curve 252 is associated with the band-pass filter 231 of the channel C1, the curve 253 with the band-pass filter 232 of the channel C2, the curve 254 with the band-pass filter 233 of the channel C3, the curve 255 with the band-pass filter 234 of the channel C4, the curve 256 with the band-pass filter 235 of the channel C5, the curve 257 with the band-pass filter 236 of the channel C6 and the curve 258 with the band-pass filter 249 of the channel C0. The boundaries of the throughpass regions of the individual bandpass filters 249, 231, 232, 233, 234, 235, 236 correspond to the formant ranges or regions 259 of the phoneme classes O, A, I, E Y, S, SH, the phonetic words of which are elucidated by the matrix 279. The formant range 259 of the phoneme classes are plotted at the left-hand side of FIG. 4 and the individual damping curves 253 to 258 are associated with the band-pass filters 231 to 236 of FIG. 3a. Such also show the matrix in the logical circuit 272 of FIG. 3b as well as the matrixes 421, 422, 423 illustrated in FIG. 6.

In order to explain the mode of operation of the arrangement of FIGS. 3a and 3b it is assumed that the microphone 201 is connected via the switch 200 to the channels C0 to C8. If, for instance, there is spoken into the microphone 201 the word "SATI", then there appears at the output of the discriminator 229, which, as already explained, is arranged in the channel C8 and serves for recognizing the plosive phoneme class T, the curve 260. Since in FIG. 3a the curve 225, which portrays the entire word "SATI" has been shown for the sake of improving the illustration above the discriminator 229, it can be easily recognized that the curve 260, which appears at the output of the aforementioned discriminator, indicates the slope $dE/dt$ of the ascending energy flank of the plosive phoneme class in the word "SATI". In similar manner there appear at the outputs of the other low-pass filters 249, 248, 247, 246, 245, 244, 243, 251 the curves 267, 266, 265, 264, 263, 262, 261 and 268. In the circuit arrangement of FIG. 3a no discriminators are connected following the low-pass filters 243 to 249. These last-mentioned curves, which are illustrated in FIGS. 3a below the curve 225 portraying the entire word "SATI", represent the most important information elements regarding the spectrum frequency distribution of the phoneme classes contained in such word. Further channels C11, C12, C13 and so forth have been shown in broken lines in FIGS. 3a and are intended to indicate that the equipment is not limited to those channels which have been previously discussed. In a very simple manner it is also possible to expand upon the equipment in order to thus recognize or detect words in which there are present up to about 12 phoneme classes. Finally, it is still to be mentioned that the filters described in conjunction with the equipment of FIG. 3a can be constructed as passive, active or digital filters. Instead of using such filters it is possible to also employ suitable devices and methods such as zero- or null-crossover detectors, peak detectors, Fourier analysers, auto-correlators, "cepstrum", "predictive coding" and so forth. Further information in this regard can be found in the Journal "IEEE Audio and Electroacoustics", June 1973, vol. AU-21, No. 3.

The information elements of the word "SATI" which are present in the curves 260 to 268 now arrive via the connection line between the outputs of the low-pass filters and the discriminators respectively, at a first logic circuit arrangement 271, 272. The first logic circuit arrangement 271, 272, which corresponds to the logic circuit 139, 162 of FIG. 2, has been divided in the exemplary embodiment of FIG. 3b into both sections 271, 272. The first section 271 serves for comparing the energy distribution as well as the time duration of each individual speech element or phoneme and for determining the pauses or intervals between such individual speech elements. Thus, the first section 271 of the first logic circuit arrangement 271, 272 of FIG. 3b is equipped with at least one clock generator 274 which carries out a quantization of the curves 260 to 268 corresponding to its clock frequency. The clock generator 274 quantizes the plosive phoneme class $\bar{T}$ with 200 Hz and the non-plosive phoneme classes T with 50 Hz. Furthermore, in the first section 271 of the first logic circuit there is provided an analog-digital converter 275 or a trigger circuit. At this location there occurs a linear logarithmic transformation of the electrical signals defined by the curves 260 to 268, so that the curves are divided into for instance four levels. These levels have been shown for the sake of clarity in illustration already at the curves 260 to 268 and have been designated by 0 to 3. Additionally, the first section 271 contains a time measurer 276 which measures the duration of each individual speech element or phoneme and the pause between the individual speech elements or phonemes. Moreover, there is provided at the first section 271 a sampler 277. The sampler 277 samples the curves 260 to 268. This sampling has been symbolically portrayed in the curves by the vertical lines. Additionally, in the first section 271 there is provided a multiplexer 278 for the input of the data into the second section 272 of the first logic circuit. The multiplexer 278 can be dispensed with in the event that the data transmission should not take place in a time-sharing operation or multiplex operation, rather according to another mode of operation. The thus determined values concerning the time duration of the individual speech elements and phonemes and the intervals or pauses between the individual speech elements and phonemes are introduced from the first section 271 into the second section 272 of the first logic circuit arrangement 271, 272. The connection between both such sections has been indicated by the arrow 2711.

In FIG. 3b there are illustrated the first and the second logic circuits 271, 272 and 273 respectively. The first logic circuit or circuit arrangement 271, 272 corresponds to the first logic circuit 139, 161 of FIG. 2. The second logic circuit 274 of FIG. 3b corresponds to the second logic circuit 142 of FIG. 2. The second section 272 of the first logic circuit arrangement 271, 272 is programed according to phonetic rules. There is provided thereat the matrix 279 for distinguising the international phoneme classes L. The phoneme classes 280 are divided into vowels V and into consonants C. The vowels V contain low, medium, high and other vowels such as O, A, I. E. The consonants C contain plosive, fricative, nasal and other phoneme classes T, S, N, R. Furthermore, it is possible to distinguish between accentuated phoneme classes L, whispered phoneme classes $\bar{L}$, phoneme classes with ascending or descending pitch $\underset{\sim}{L}$, $\overset{\sim}{L}$. These differentiations are undertaken at the matrix 279 which is connected with the channels C0, C1, C2, C3, C4, C5, C6, C7, C8 of FIG. 3a. The differentiation or distinguishing operation is portrayed below the matrix 279 with the just-mentioned symbols and is available in the arrangment 280 for the further processing. In the arrangement for the time classes 281 there are undertaken the following distinguishing operations for the time duration. This has been shown in the following Table II.

TABLE II

| | Symbol | Time Duration |
|---|---|---|
| Explosion of plosive phonemes or speech elements (p,t,k,b,d,g) of the phoneme class T internal silences before the explosion (or pitch at b,d,g) | T | 5 – 40 ms |
| | — | 65 – 200 ms |
| total time duration of the plosive phonemes or speech elements | –T | 70 – 240 ms |
| complete time duration of the non-plosive phoneme classes T such as vowels, fricative, nasal and other phoneme classes (V,S,N,R) | $\bar{T}$ | 100 – 300 ms |

Exploded vowels possess a shorter time between the start of the explosion and the vowel than exploded consonants such as k, t with following vowels. Due to the division into time classes false information including disturbing noises, such as static in the transmission lines or mouth noises, are separated from the useful information, so that there are eliminated false decisions. The sub-division of the phoneme classes into time classes which is present in the arrangement 281 is used in the manner that in the subsequently arranged arrangement 282 such phonemes or speech elements are segmented. Such segmentation constitutes a change in the spectrum in conjunction with its physical effect (energy x time), with or without explosion. In the subsequently arranged arrangement 283 there are detected the phonemes. Such detection or recognition is undertaken by a majority decision in the matrix 279 or by calculating extreme values of the so-called vectorial distances between the individual phonemes and speech elements respectively. The technical details for carrying out such speech recognition have been described in the following publications incorporated herein by reference:

Flanagan, J., "Speech Analysis, Synthesis and Perception", 2nd Ed. Springer-Verlag, New York 1972, Dreyfus-Graf, J., "Reconnaissance de signaux et régulation d'information", Revue d'Acoustique, Paris, No. 18, 1972, Dreyfus-Graf, J., "Actuateur phonétique (phonacteur) et calculatour" Revue d'Acoustique, Paris, No. 9, 1970, "IEEE Transactions on Audio and Electroacoustics", June 1973, Vol AU-21, No. 3.

In the second logic circuit 273 of FIG. 3b, which corresponds to the logic circuit 142 of FIG. 2, there are programmed the linguistic rules of the phonocode. This can be for instance a phonocode "SOTINA", which will be described more fully hereinafter.

The following Table III illustrates the combinations, i.e. the maximum word number $W = K^L$ which can be theoretically formed when $K = 4$ to 10 phoneme classes should be recognized and when there should be formed words with $L = 1$ to 4 phoneme classes. Approximately one-half of the theoretically possible number W of the words can be easily spoken or pronounced.

TABLE III

| L | K = | 4 | 5 | 6 | 7 | 8 | 9 | 10 |
|---|---|---|---|---|---|---|---|---|
| 1 | | 4 | 5 | 6 | 7 | 8 | 9 | 10 |
| 2 | | 16 | 25 | 36 | 49 | 64 | 81 | 100 |
| 3 | | 64 | 125 | 216 | 343 | 512 | 729 | 1000 |
| 4 | | 256 | 626 | 1296 | 2401 | 4096 | 6561 | 10000 |
| 5 | | .- | 3125 | 7776 | 16807 | 32768 | 59049 | 100000 |

The alphanumeric phonocode "SOTINA", which has been described more fully in the Tables IV to XIII, uses three consonant classes T, S, N and three vowel classes O, A, I, that is to say, $K = 6$ phoneme classes, by means of which it is possible to theoretically build up to $6^5 = 7776$ words with $L = 5$ phoneme classes per word. The phonocode "SOTINA" is based upon ten elementary words O, I, TO, TI, TA, SO, SI, SA, NI, NA, which express the cardinal numbers 0 to 9. Furthermore, this phonocode is based upon five classes of non-elementary words. All of the words follow logic linguistic rules, as will be explained hereinafter:

a. Randomly successively arranged elementary words express the cardinal numbers from 10 to infinity; Example: INASATA = 1974;

b. Random successively arranged elementary words, to which there is added a final N, express ordinal numbers; Example: INAN = 19 (the nineteenth);

c. Elementary words which end with S, express arithmetic or logical operations; Example: TOS = + (plus);

d. Words which contain two successive consonants CC constitute instruction words; Example: ASTASO means that the subsequent numbers 1 to 26 are intended to espress the 26 letters of the alphabet; and e. Special words which exhibit at the start or after another vowel O or I an "A" save on repetition; Example: IANAO = 1 billion = $10^9$ (the number 1 followed by nine zeros).

The logical linguistic rules which are given when using the phonocode "SOTINA" permit explaining the mode of operation of the second logic circuit 273 of FIG. 3a which corresponds to the logic circuit 142 of FIG. 2. The second lgoic circuit 273 receives via the conductor or line 2721 the digital information elements regarding the 6 phoneme classes T, S, N, O, A, I. In the second logic circuit 273 there are provided 12 logical switching circuits 284 to 295. The logical switching circuits 284 to 295 contain digital registers and decision circuits. In the logical switching circuit 284 there are stored in sequence the phoneme classes and divided into individual words, the ends of which are characterized by external word pauses which are greater than 0.5 second. In the logical switching circuit 285 there is determined whether a word does or does not contain two successive consonants. If two successive consonants are detected then such is an instruction word which determines the further operation until the next instruction word. If the logical switching circuit 285 is not able to detect two successive consonants, then the logical switching circuit 286 finds out whether the word begins with "A" or contains "OA" or "IA" or "AA". If the logical switching circuit 286 decides with "No" then in the following logical switching circuit 287 there is determined whether the word ends with a vowel V or with a consonant C or S. If the word ends with a vowel then such is a cardinal number which is stored in the register 288. If there is determined at the logical switching circuit 287 that the word ends with a consonant C then such is an ordinal number which is stored in the register 289. If the logical switching circuit 287 determines that the word ends with a consonant S then such is an arithmetic or logical operator which is stored in the register 290. In the logical switching circuit 291 the operation is carried out and subsequently stored. If there is determined in the logical switching circuit 285 an instruction word with successive consonants CC, then such is an alphabet. In this case in the logical switching circuit 292 the numbers 1 to 26 are replaced by the letters A to Z and stored. A pause which is smaller or greater than one second signifies the end of a letter or an alphabetic word. If the logical switching circuit 286 determines that the word begins with "A" or contains "IA" or "OA" or "AA", then this means —as already mentioned— repetition of certain numbers. Such is stored in the register 293 and arrives from that location at the cardinal numbers already stored in the register 288. The result of the data processing in the second logic circuit 273 is stored in the register 294 and can be rendered visually or acoustically discernible by the indicator device 295. This device 295 corresponds to the output device 146 of FIG. 2.

Figure 5:
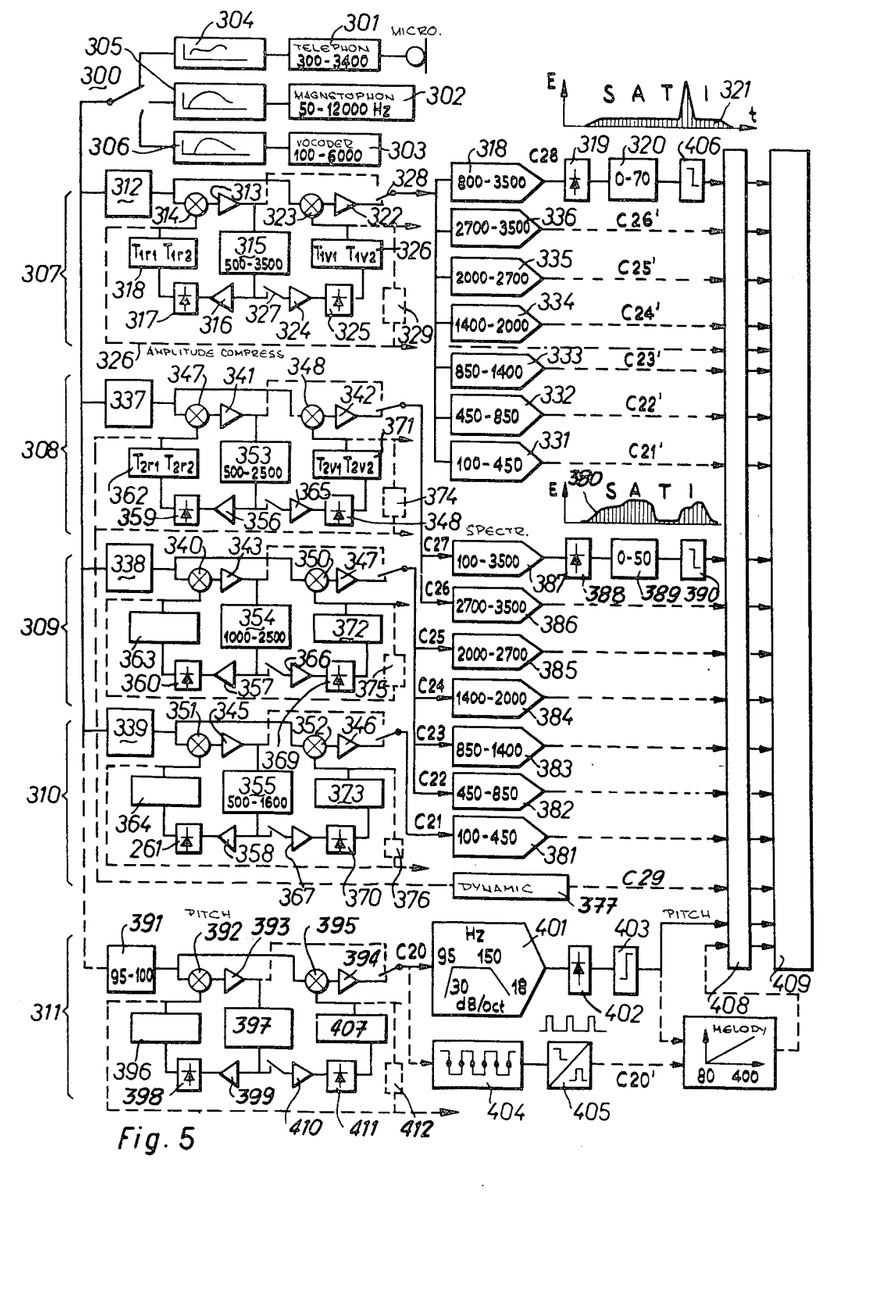
FIG. 5 is a variant construction of the apparatus from that shown in FIGS. 3a and 3b.

The inventive apparatus of FIG. 5 illustrates an analyser component which is different from FIG. 3a, and which according to the showing of FIG. 5 simulates the non-linear law of the ear with regard to the signal energy. According to the showing of FIG. 5 a microphone 301, a magnetic tape recorder 302 and a vocoder 303, which have different frequency bands, can be selectively connected via a switch 300 with the inventive apparatus. The different frequency ranges have been plotted in FIG. 5 exactly as was the case for FIG. 3a in the corresponding blocks. The different input devices such as, for instance, microphone, magnetic tape recorder, vocoder, are selectively connectable with the switch 300 via their filters 304, 305, 306, which normalize the speech spectrum between about 200 Hz and 3400 Hz. The filters 304, 305, 306 therefore have a filter action which is accommodated to the associated input devices. This has been shown in FIG. 5 by the different curves in the blocks representing the filters. In the description to follow it is assumed that a magnetic tape 302 is connected via the switch 300 with the inventive apparatus. The speech signals from the magnetic tape device 302 arrive at the parallel connected inputs of the selective amplitude compressors 307, 308, 309, 310 and 311. Details of a suitable selective amplitude compressor have been disclosed in applicant's British Pat. No. 1,346,327 and in the corresponding U.S. application Ser. No. 122,612, filed Mar. 1, 1971, now U.S. Pat. No. 3,838,217, granted Sept. 24, 1974 and entitled "Amplitude Regulator Means For Separation Of Frequency Variation and Amplitude Variation of Electrical Signals", and the disclosure of which is incorporated herein by reference. Hence, in the following description the different amplitude compressors will be only discussed to such an extent in conjunction with FIG. 5 as is necessary for fully understanding the concepts of this development. The compressor 307 serves for separating the plosive and fricative phoneme classes T and S. In the other amplitude compressors 308, 309, 310 there are separated the characteristic spectrum of the phoneme L from the dynamics. The compressor 311 serves to separate the fundamental frequency (pitch) from the other frequency components. The plosive compressor 307 contains a filter 312 which is constructed as a high-pass filter with 800 Hz, as well as a gain variable amplifier. The variable amplifier consists of a constant amplifier 313 with a backward loop with a filter 315, the throughpass or pass frequency of which amounts to 500 Hz to 3500 Hz, an amplifier 316, a rectifier 317 and a low-pass filter 318. The variable amplifier possesses approximately an ascending time-constant $T_{1r1} = 10$ ms and a descending time-constant $T_{1r2} = 30$ ms. This compressor regulates in different ways slowly ascending phonemes, such as for instance the phonemes of the fricative and the plosive class S, T. If, for instance, a signal which corresponds to the word "SATI", is further processed by the band-pass filter 318 (frequency 800 Hz to 3500 Hz), the rectifier 319 and the low-pass filter 320 (frequency 0 to 70 Hz), then there appears the curve 321 which indicates the distribution of the energy E as a function of time. The curve 321 shows that the compressor 307 with the channel C28 separates the plosive phoneme class T from the fricative phoneme class S. The amplitude compressor 307 can possess a second variable amplifier which is illustrated by the following elements: A constant amplifier 322 with multiplier 323, a forward loop with amplifier 324, a rectifier 325 and a low-pass filter 326. This low-pass filter possesses an ascending and descending time-constant $T_{1v1} = T_{1r1} = T_{1v2} = T_{1r2}$. The compressor with the single loop, which is also designated as a backward loop ("r" = backward), delivers a simple logarithmic law of the amplitude regulation. The compressor with double loop, which possesses both the backward loop "r" as well as also the forward "v", delivers a double logarithmic or potential law, which corresponds to the behaviour of the ear. Depending upon the position of the switch means 327 and 328 the compressor 307 works with a single or double loop. The forward loop 324, 325, 326 possibly can be replaced by the broken connection with the transmission means 329, which can facilitate the balancing of the backward and forward loops.

Arranged after the selective amplitude compressor 307 are the band-pass filters 331, 332, 333, 334, 335, 336 and the corresponding rectifier means including the low-pass filters in the same manner as the rectifier 319 and the low-pass filter 320 of the channel C28. The band-pass filters 331 to 336 of the channels C21' to C26' separate the spectrum of the plosive phoneme class T from the spectrum of the vowels V. This differentiation occurs also then in the event that the vowels V should suddenly appear and should have a certain similarity with the plosive phonemes and speech elements respectively. The selective amplitude compressors 308, 309, 310 are constructed in the same manner as the above-described selective amplitude compressors 307. The compressors 308, 309, 310 possess the input filters 337, 338, 339, the amplifiers 341 to 346, the multipliers 347 to 352, the forward loops with the band-pass filters 354 to 355, the amplifiers 356 to 358, the rectifiers 359 to 361, the low-pass filters 362 to 364 and the corresponding forward loops 365 to 373 or the transmission means 374 to 376. As concerns the aforementioned low-pass filters 362, 363, 364, 371, 372, 373 the ascending and descending time-constants $T_{2r1}$, $T_{2r1}$ and $T_{2r2}$, $T_{2r2}$ respectively, are different. The ascending time-constants amount to approximately 1 ms and the descending time-constants amount to approximately 10 ms. Consequently, the explosions of the plosive phonemes or speech elements of the class T are suppressed. After processing by the band-pass filters 381 to 387, the rectifier 388 and the low-pass filter such as 389 (0 to 50 Hz) there appears at the channels C21 to C27 the word "SATI" corresponding to the energy curve as such has been shown, for instance, only for the channel C27 in FIG. 5 as the energy curve 380. Consequently, the quasi-stationary spectrum (formants) are separated from the dynamics 377, which for instance appears through the error signal at the output of the low-pass filter 362 (channel C29).

The selective amplitude compressor 311 serves to extract the fundamental frequency (pitch). This compressor contains an input filter 391 (with the throughpass frequency of 95 Hz to 100 Hz), amplifiers 393, 394, multipliers 392, 395, backward loops and forward loops with the common band-pass filter 397, the amplifiers 399, 410, the rectifiers 398, 411, the low-pass filters 396, 407. The ascending time-constant amounts for this compressor to approximately 4 ms and the descending time-constant amounts to approximately 20 ms. The just-mentioned components 410, 411, 407 can be replaced by the transmission means 412. Connected after the compressor 311 are the channels C20 and C20'. The channel C20 contains a band-pass filter 401 for the throughpass frequency of 95 Hz to 150 Hz, a rectifier 402 and a trigger 403, so that there can be indicated an indication "YES - NO" for the fundamental frequency. In this way there can be separated voiced phonemes L from voiceless or whispered phonemes L. The channel C20' contains a zero or null crossover detector 404 and a counter 405, so that the fundamental frequency (pitch or melody) for instance of 80 Hz to 400 Hz can be measured and indicated. The compressor 311 regenerates the energy of the fundamental frequency. The higher components are removed from the fundamental frequency by the compressor 311 and the subsequently arranged elements of the channels C20, C20' such as the band-pass filter 401, rectifier 402, trigger 403, null crossover detector 404, counter 405.

The information elements obtained by the previously described apparatus (compressors 307, 308, 309, 310, 311, channels C20, C20', C21, C22, C23, C24, C25, C26, C27, C21', C22', C23', C24', C25', C26', C28') are delivered either to the trigger circuits or logic circuits 408, 409. The trigger circuits are arranged in each channel, such as for instance shown for the trigger circuit 390, 402, 406 and the channels C20, C27, C28. Both of the logic circuits 408, 409, which only have been symoblically shown in FIG. 5, correspond to both of the circuits 139, 142 of FIG. 2 and the logic circuits 271, 272, 273 of FIGS. 3a and 3b. As already stated above in conjunction with FIGS. 2, 3a and 3b, the information elements are processed in the logic circuits 408, 409 of FIG. 5 in the same manner and serve to control certain machines.

Finally, it is to be still mentioned that during the discussion of FIG. 5 it was assumed that the input occurs by means of the magnetic tape recorder device 302. If the input is to take place by means of the microphone 301, then there is employed a microphone which is practically insensitive to surrounding noises. Furthermore, threshold values at the individual amplitude compressors 307 to 311 and threshold values in the logical circuits 408, 409 eliminate the acoustical energy which does not correspond to the speech.

Figure 6:
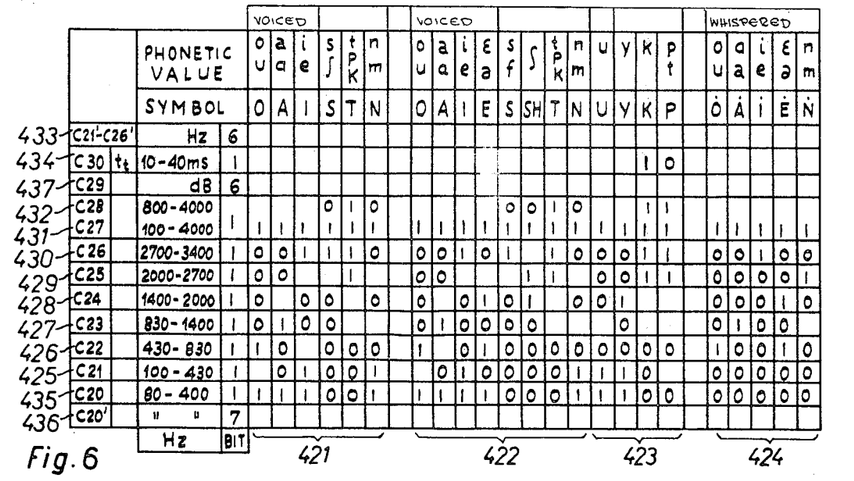
FIG. 6 illustrates recognition matrixes for the devices shown in FIG. 4 or FIG. 5.

FIG. 6 illustrates four decision matrixes 421, 422, 423, 424 of the first logic circuit 139, 161, 272, 400, and which matrixes evaluate the binary information of the plosive- and spectrum-channels C21, C22, C23, C24, C25, C26, C27, C28 as well as the channels C21', C22', C23', C24', C25', C26' of FIG. 5. Such information arrives at the lines 425 to 433 of the decision matrixes depicted in FIG. 6. As shown in FIG. 6 it is possible to separate from one another by means of the matrix 421 the six phoneme classes O, A, I, S, T, N. The matrix 422 separates the eight phoneme classes O, A, I, E, S, SH, T, N. If the channel C30 of FIG. 5 is employed according to line 434 of FIG. 6, then the time spacing between the plosive phoneme or speech elements of the class T and the subsequent vowels of the class V can be given. This time spacing is smaller after the phonemes "p" and "t" (10 ms to 20 ms) than after the phoneme "k" (30 ms to 40 ms). The matrix 423 therefore separates the phonemes p and t (class P) from the phoneme k (class K). There can also be added the vowel U (u), which however is difficult to separate from "o", or the vowel Y (y), which however is not internationally valid. Now if there is added the channel C20 of FIG. 5 according to line 435 of FIG. 6 into the designated as follows: OTISA, SOTINA, SOTINAE, SOTINASHE. Such codes have 5, 6, 7, 8 phoneme classes, which has been designated by L = 5, 6, 7, 8. These classes are illustrated in a pentagon 429, a hexagon 430, a heptagon 431 or in an octagon 432. The vowel square 433 O, A, I, E can be illustrated by the light colors rosa, yellow, yellow-green, green. The consonant square 434 N, SH, ST can be illustrated by the dark colors brown, turquoise, blue, violet. The hexagon 430 can be divided into a vowel triangle 435 and a consonant triangle 436. A color code can facilitate the learning of a speech code. The phonemes of code "SOTINA" can be spoken as "sotina". It can also be spoken as "shupema" and so forth. What is important in this regard is that only the classes of the phonemes are respected.

Figure 8:
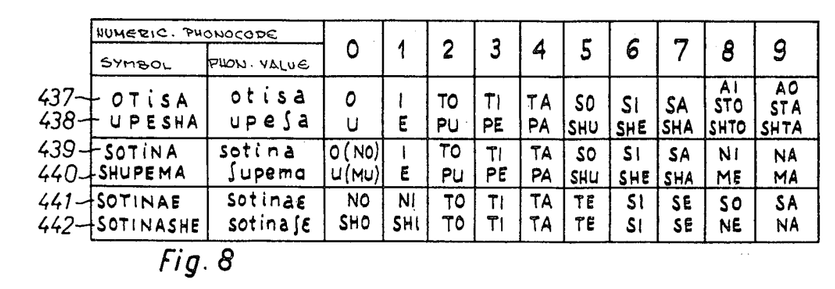
FIG. 8 illustrates a number of examples of phonetic codes for the main or basic numerals.

FIG. 8 illustrates a possible fundamental word of number code from null to 9, such as O, I, TO, TI, TA, SO, SI, SA, AI, AO or NO, I, TO, TI, TA, SO, SI, SA, NI, NA and so forth according to the lines 437 to 442.

On the basis of the following Tables IV to XIII there is indicated that the inventive apparatus of FIGS. 2, 3a, 3b and 5 can be employed for many fields of application of speech recognition. In these Tables there have been indicated an expanded system of the already mentioned code "SOTINA". With this expanded system it is possible to code all alphabetic languages.

TABLE IV

| 1. Cardinal numbers: | ending with V, composed of O, I or T, S, N + A, O, I<br>A = with (avoids repetitions);<br>NO = free (possibly = null) | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 20 | 100 | 124 | 1972 |
| O | I | TO | TI | TA | SO | SI | SA | NI | NA | IO | TOO | 100 | ITOTA | INASATO | decision matrix (pitch: YES - NO), then it is possible to also code whispered speech by means of the arrangement of the matrix 424. It is possible for a further channel C20' (line 436 of FIG. 6) to indicate up to 128 pitches of the fundament frequency (7 bit), and channel C29 (line 437) up to 64 degrees of accentuation (6 bit) of the dynamics. Reference character E' designates the whispered phoneme class E, in contrast to E which in Table I designates generall whispered vowels.

Figure 7:
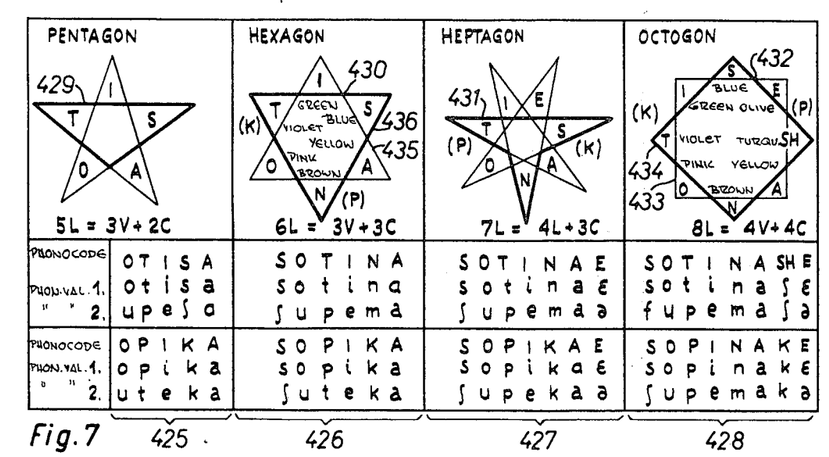
FIG. 7 is a geometric, colored and symbolic illustration of the basic classes of speech elements and phonetc codes.

FIG. 7 illustrates a geometric and timber or sound color of four speech codes 425 to 428, which codes are

TABLE V

| 1.000 =<br>1 with 3 Nulls<br>IATIO | 10.000 =<br>1 with 4 Nulls<br>IATAO | 100.000 =<br>1 with 5 Nulls<br>IASOO | $10^{12}$ =<br>1 with 12 Nulls<br>IAITOO |
|---|---|---|---|

TABLE VI

| 2. Ordinal numbers: Cardinal numbers + N + Pause (Pause = (.)<0.5 sec) | | | | | | | | | | | |
|---|---|---|---|---|---|---|---|---|---|---|---|
| 0. | 1. | 2. | 3. | 4. | 5. | 6. | 7. | 8. | 9. | 10. | 1000. | 342222. |
| ON· | IN· | TON· | TIN· | TAN· | SON· | SIN· | SAN· | NIN· | NAN· | ION· | LATAON· | TITAATATON· |

TABLE VII

| 3. Arithmetic Operators: basic word + S + Pause | | | | | | | | |
|---|---|---|---|---|---|---|---|---|
| Equal | greater than | smaller than | plus | times | power | minus | divided | comma |
| = | > | < | + | × | | − | : | , |
| OS· | AS· | IS· | TOS· | TIS· | TAS· | NOS· | NIS· | NAS· |

4. Pauses: point or spacing after a word (.) >0.5 sec.     after a sentence (..) >2 sec.

TABLE VIII

| 5. Instruction word: initial A, two adjacent consonants CC | | | | | | | |
|---|---|---|---|---|---|---|---|
| cardinal | ordinal | alphabet | stop | start | mountain | cancel | telephone number |
| ASTA· | ASTAN· | ASTASO· | ASTOT· | ASTAT· | ANANT· | ASNO· | ASTANO· |
| binary | octal | | | | | | |
| ASTAI·TO TI | ASTAO· | NO NI TO TI TA SO SI SA | | | | | |

TABLE IX

6. Alphabet I (numerical system for spelling) Instruction: ASTASO·IN·

| a | b | c | d | e | f | g | h | i | j | k | l | m | n | o |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| I | TO | TI | TA | SO | SI | SA | NI | NA | IO | II | ITO | ITI | ITA | ISO |

| p | q | r | s | t | u | v | w | x | y | z | | | | |
|---|---|---|---|---|---|---|---|---|---|---|---|---|---|---|
| 16 | 17 | 18 | 19 | 20 | 21 | 22 | 23 | 24 | 25 | 26 | | | | |
| ISI | ISA | INI | INA | TOO | TOI | TOTO | TOTI | TOTA | TOSO | TOSI | | | | |

TABLE X

7. Alphabet II: phonetic system for spelling. instruction: ASTASO·TON·

| a | e | i | o | u | l | m | n | r | c | f | s | h |
|---|---|---|---|---|---|---|---|---|---|---|---|---|
| A | IA | I | O | IO | NO | NA | NI | NAO | SO | SA | SI | STA |

| j | v | w | z | p | k | q | t | b | g | d | x | y |
|---|---|---|---|---|---|---|---|---|---|---|---|---|
| SOO | SAO | SAOSA | SIO | TO | TA | TIA | TI | TOO | TAO | TIO | TAS | II |

TABLE XI

8. Examples: a) Cardinal numbers. Instruction ASTA·

| 60 | 700 | 9000 | 1 Billion = $10^9$ | 0.000.002 = $2 \cdot 10^{-6}$ |
|---|---|---|---|---|
| SIO | SAOO | NAATIO | IANAO | O.NAS.SOOTO |

Telephone number:
| 00 | 3 3 | 1 | 3 2 6 | 5 7 1 2 |
|---|---|---|---|---|
| 00 | TITI | I | TITOSI | SOSAITO |

TABLE XII b) Spelling, alphabet I, Instruction ASTASO·IN
alphabet II, Instruction ASTASO·TON

| | G | e | n | e | v | e | N | e | w | Y | o | r | k |
|---|---|---|---|---|---|---|---|---|---|---|---|---|---|
| I. | SA | SO | ITA | SO | TOTO | SO | ITA | SO | TOTI | TOSO | ISO | INI | II |
| II. | TAO | IA | NI | IA | SAO | IA | NI | IA | SAOSA | II | O | NAO | TA |

| | B | o | s | t | o | n |
|---|---|---|---|---|---|---|
| I. | TO | ISO | INA | TOO | ISO | ITA |
| II. | TOO | O | SI | TI | O | NI |

TABLE XIII c) Names of mountains by altitude (m), Instruction ANANT·

| | | | | | | |
|---|---|---|---|---|---|---|
| Mont-Blanc | 4807 TANIOSA | Monte Rosa | 4638 TASITINI | Mischabel (Dom) | 4554 TASOSOTA | |
| Matterhorn | 4482 TATANI-TO | Lysskamm | 4478 TATAS-ANT | Dent-Blanche | 4364 TASISITA | |
| Jungfrau | 4166 TAISISI | Mönch | 4105 TAIOSO | | | |

If the word is spoken into a telephone line and if there is present a disturbing noise level, which is a number of dB below the level of the useful information, then it is significantly better for the plosive class to select the sound "*k*" instead of the sound "*t*". Furthermore it is advantageous for the fricative class to select the sound "*sch*" (= *sh* = S) instead of the sound "*s*". Additionally, in this case the vowel "O" should be spoken closed as in the French sound "ô". For the sound "sh" there can be written the expression "Ŝ". Hence, the entire expression "SOTINA" can be spoken as "ŜÔkina", which can be written as "ŜÔKINA".

The subsequent Table XIIII illustrates a detailed example of the code SETE (line 122 of FIG. 1 and Table 143 of FIG. 2). In this way it is also possible to code the letters of the alphabet, for instance, as demonstrated by the following:

TABLE XIV (phonocode SETE, (binary-decimal); S,T spoken as SĚ, TĚ (Ě=E whispered)

1. Cardinal numbers

| 0 | 1 | 2 | 3 | 4 | 5 | 6 | 7 | 8 | 9 | 10 | 20 .... | 100 .... | 1972 |
|---|---|---|---|---|---|---|---|---|---|---|---|---|---|

TABLE XIV-continued (phonocode SETE, (binary-decimal); S.T spoken as SE, TE (E=E whispered))

| S· | T· | TS· | TT· | SS· | ST· | TTS· | TTT· | SSS· | SST· | T·S·· | TS·S·· | T·S·S·· | T·SST·TTT·TS·· |
|---|---|---|---|---|---|---|---|---|---|---|---|---|---|

2. Alphabet I (numerical)

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| T· | TS· | TT· | SS· | ST· | TTS· | TTT· | SSS· |   |   |   |   |   |   |   |
| SST· | T·S· | T·T· | T·TS· | T·TT· | T·SS· | T·ST· |   |   |   |   |   |   |   |   |
| a | b | c | d | e | f | g | h | i | j | k | l | m | n | o |

| 16 | 17 | 18 | 19 | 20 | 21 | 22 | 23 | 24 | 25 | 26 |
|---|---|---|---|---|---|---|---|---|---|---|
| T·TTS· | T·TTT· | T·SSS· | T·SST· | TS·S· | TS·T· | TS·TS· | TS·TT· | TS·SS· | TS·ST· | TS·TTS· |
| p | q | r | s | t | u | v | w | x | y | z |

3. Alphabet II (Morse)

a) (.) = S, (-) = T   ; S,T spoken as SĒ, TĒ
b) (.) = T, (-) = S

|   | a | b | c | d | e | f | g | h | i | j | k | l | m | n |
|---|---|---|---|---|---|---|---|---|---|---|---|---|---|---|
| a) | ST· | TSSS· | TSTS· | TSS· | S· | SSTS· | TTS· | SSSS· | SS· | STTT· | TST· | STSS· | TT· | TS· |
| b) | TS· | STTT· | STST· | STT· | T· | TTST· | SST· | TTTT· | TT· | TSSS· | STS· | TSTT· | SS· | ST· |

|   | o | p | q | r | s | t | u | v | w | x | y | z |
|---|---|---|---|---|---|---|---|---|---|---|---|---|
| a) | TTT· | STTS· | TTST· | STS· | SSS· | T· | SST | SSST· | STT· | TSST· | TSTT· | TTSS· |
| b) | SSS· | TSST· | SSTS· | TST· | TTT· | S· | TTS· | TTTS· | TSS· | STTS· | STSS· | SSTT· |

---

While there is shown and described present preferred embodiments of the invention, it is to be distinctly understood that the invention is not limited thereto but may be otherwise variously embodied and practiced within the scope of the following claims.

What is claimed is:

1. A speech recognition apparatus for controlling a machine, said apparatus receiving words, said words being classified in a reduced plurality of three through twelve phoneme classes, said apparatus including:

a. input means for receiving said words;

b. first means responsive to said words indicating short-time energy values of said words, said first means producing a first output signal representing rising temporal energy flanks (slopes), nearly constant energy levels and zero levels of said words;

c. second means responsive to said words and producing a second output signal representing a steepness of said rising temporal energy flanks exceeding a determined limit value;

d. first logic means i. responsive to said first output signal segmenting said words into phonetic elements, indicated by both the rising temporal energy flanks and the ends of the nearly constant energy levels and indicating an end of each word only by a zero level which exceeds a determined value of time duration producing a third output signal, ii. responsive to said second output signal separating a class of the plosive phonetic elements from the class of the fricative phonetic elements and producing a fourth output signal, e. second logic means detecting a sequence of the occurrence of said phonetic elements within one word; and f. output means for controlling a machine as a result of the detected words.

2. A speech recognition apparatus as defined in claim 1, wherein said first and second logic means includes circuit means responsive to said zero levels of said first output signal to determine an end of a word by exceeding the time duration value in an area between 0.2 sec. and 0.5 sec., and to determine an end of a phonetic element by dropping below the time duration value in an area between 0.2 sec. and 0.5 sec.

3. A speech recognition apparatus as defined in claim 2, wherein said circuits responding to said zero levels of said first output signal determine an end of a group of a plurality of words by exceeding the time duration value in an area between 2 sec. and 5 sec. and to determine an end of a word by falling down below the time duration value in an area between 2 sec. and 5 sec.

4. A speech recognition system for controlling a machine, said system receiving words, said words being classified in a reduced plurality of three through twelve phoneme classes, said system including:

a. input means for receiving said words;

b. first means responsive to said words indicating short-time energy values of said words, said first means producing a first output signal representing rising temporal energy flanks, nearly constant energy levels and zero levels of said words;

c. second means responsive to said words and producing a second output signal representing a steepness of said rising temporal energy flanks exceeding a determined limit value;

d. third means responsive to said words producing at least three output signals representing said short-time energy values distributed in at least three frequency ranges;

e. first logic means i. responsive to said first output signal segmenting said words into phonetic elements, indicated by both the rising temporal energy flanks and the ends of the nearly constant energy levels, and indicating an end of each word only by a zero level which exceeds a determined value of time duration producing a third output signal, ii. responsive to said second output signal separating a class of the plosive phonetic elements from the class of the fricative phonetic elements and producing a fourth output signal, iii. responsive to said three output signals for detecting the plosive class, the fricative class and at least one vowel class and producing a fifth, sixth and seventh output signal;

f. second logic means detecting a sequence of the occurrence of said phonetic elements within one word; and g. output means for controlling a machine as result of the detected words.

5. A speech recognition apparatus related to claim 4, wherein said third means embody additional circuit means to determine a class of nasal phonetic elements.

6. A speech recognition apparatus as defined in claim 4, wherein said first logic means include a circuit means responsive to zero levels of said first output signal indicating the time duration of the silences between all phonetic elements, said circuit means delivering a signal to eliminate a noise from said phonetic elements when said silence before a non plosive phonetic element exceeds a determined time duration value or when said silence before a plosive phonetic element drops below said determined time duration value.

7. A speech recognition apparatus as defined in claim 4, wherein said second logic means includes circuit means for segmenting a composed word in its elementary words, each of them composed of a single vowel or a single consonant followed by a single vowel, said segmentation being operated by said end of each vowel indicated by said first logic means.

8. A speech recognition apparatus as defined in claim 4, wherein said second logic means includes circuit means for recognizing an instruction word having an end with a consonant followed by a silence or including two adjacent consonants.

9. A speech recognition apparatus as defined in claim 4, wherein said second logic means includes circuit means responsive to two following and adjacent vowels, the second vowel belonging to a selected vowel class recognizing a special elementary word for avoiding a repetition of the same phonetic element.

10. A speech recognition apparatus as defined in claim 4, wherein said second logic means includes circuit means responsive to an initial vowel of a selected vowel class recognizing a special elementary word for avoiding a repetition of the same phonetic element.

11. A speech recognition apparatus as defined in claim 4, wherein said first, second and third means includes a plurality of amplitude compressors consisting of one backward loop for controlling both the backward amplifier and a forward amplifier.

12. A speech recognition apparatus as defined in claim 4, wherein said first logic means includes a first matrix for recognizing both three classes of consonants and three classes of vowels.

13. A speech recognition apparatus as defined in claim 4, wherein said first logic means includes a second matrix for recognizing both four classes of consonants and four classes of vowels.

14. A speech recognition apparatus as defined in claim 4, wherein said first logic means includes a third matrix for recognizing subclasses of consonants and vowels.

15. A speech recognition system for controlling a machine, said system receiving elementary words, each of which are constituted by a voiced or whispered consonant followed by a vowel, said consonant being chosen among two phoneme classes, a first class of which has an energy evolution of sudden initial transition, a second class of which has an energy evolution of soft transition, said system including:

a. input means for receiving said words and shaping the frequency spectrums of said words;
b. first means responsive to said shaped frequency spectrums of said words and producing a first output signal representing a temporal energy evolution of said words within a general frequency range;
c. second means responsive to said shaped frequency of said vowels and producing a second output signal representing the rising steepness of the temporal energy variations within a high frequency range;
d. first logic means
  i. responsive to said first output signal to produce a third output signal which indicates segmenting said elementary words;
  ii. responsive to said second and third output signals producing a fourth output signal indicating the sudden or soft initial transition of said elementary words; and
e. second logic means responsive to both the third and the fourth output signals for counting combinations of at least two classes of said elementary words.

16. A speech recognition system for controlling a machine, said system receiving elementary words each of which are constituted by one vowel preceded by one consonant, said vowel being chosen among two phoneme classes, one of which class has high vowels and the other class has low vowels, said consonant being chosen among two phoneme classes, a first class of which has an energy evolution of sudden initial transition, a second class of which has an energy evolution of soft initial transition, said system including:

a. input means receiving said words and shaping the frequency spectrums of said words;
b. first means responsive to said shaped frequency spectrums of said words and producing a first output signal representing a temporal energy evolution of said words within a general frequency range;
c. second means responsive to said shaped frequency of said vowels and producing a second output signal representing the rising steepness of the temporal energy variations within a high frequency range;
d. first logic means
  i. responsive to said first output signal to produce a third output signal which indicates segmenting said elementary words;
  ii. responsive to said second and third output signals producing a fourth output signal indicating the sudden or soft initial transition of said elementary words; and
e. second logic means responsive to both the third and the fourth output signals for counting combinations of at least two classes of said elementary words.

* * * * *